United States Patent Office
3,272,781
Patented Sept. 13, 1966

3,272,781
BOROUREAS OF PHOSPHINOBORINE POLYMERS
Marvin H. Goodrow, Los Angeles, Calif., assignor to American Potash & Chemical Corporation, Los Angeles, Calif., a corporation of Delaware
No Drawing. Filed Aug. 7, 1963, Ser. No. 300,697
16 Claims. (Cl. 260—77.5)

The present invention relates, in general, to the preparation of phosphinoborine borourea compounds and to the compounds thus prepared.

It is known that phosphinoborine polymers are of value where high thermal and hydrolytic stability are desired. These materials are also known for their value as high temperature dielectric materials. One specific application for these materials is as laminating resins which when used, for example, in combination with fiberglass, are very resistant to thermal, chemical and electrical attack.

It is often desired to vary the physical properties of phosphinoborine polymers to meet the needs of a specific application. Considerable difficulty has been encountered in tailoring specific phosphinoborine polymers to the desired characteristics.

Broadly, in accordance with the present invention, it has been determined that phosphinoborine borourea polymers enjoying utility as elastomers, adhesives and thermally stable fluids can be prepared by treating the corresponding B-isocyanato phosphinoborine polymers with certain amines.

More specifically, the process of the present invention comprises reacting a B-isocyanato phosphinoborine polymer with an amine. The B-isocyanato phosphinoborine polymer is chosen from those having any of the general formulas:

(a) $[R_4R_3PB(Y)_2]_n$
(b) $[R_4R_3PB(Y)_2]_nA$
(c) $[(Y)_2BP(R_3)R(R_3)PB(Y)_2]_n$
(d) $[R_4R_3PB(Y)_2]_m[R_3PBY]_z$

In the above formulas, $R_3$ and $R_4$ can be any of the alicyclic, acyclic, or arene hydrocarbyl substituents, each substituent being independently selected for each position on each monomeric unit. The substituent R can be any bivalent acyclic, alicyclic or arene hydrocarbylene substituent.

The integer $n$ is indicative of the degree of polymerization of the phosphinoborine polymers. The ratio of the integers $m$ to $z$ in the polymer (d) is indicative of the extent of ring fusion and is between about 0.1:1 and about 6:1. The terminal groups of the polymer (b) on one end of the chain are basic in nature, designated A, and can conveniently be tertiary amines, tertiary phosphines, secondary amines or secondary phosphines. While this invention is not limited to any theory, it is believed that the other end of the polymer (b) is blocked by an acidic —$BH_3$ group.

In the above formulas, Y is selected independently for each position and can be any of hydrogen; the hydrocarbyl acyclic, alicyclic, or arene substituents; or the isocyanato substituent. At least one Y substituent in each of the phosphinoborine polymers (a), (b), (c) and (d) is the isocyanato radical. The B-isocyanato phosphinoborine polymers designated above as (a) through (d) are conveniently prepared by treatment of the corresponding B-halophosphinoborine polymers with metallic cyanato salts. One convenient method for the preparation of these compounds is more specifically described in assignee's copending application Serial No. 191,351 filed April 30, 1962.

The amines which can be utilized to produce the phosphinoborine borourea compounds of this invention include those N-hydroamines such as the primary and secondary amines having the formulas:

(1)  $(HNR_1)_tR_2$ (2)  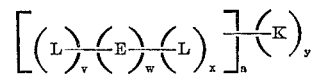

and mixtures thereof.

In the above formulas, $R_1$ and $R_2$ are each independently chosen for each position and can be any of hydrogen, or the hydrocarbyl acyclic, alicyclic or arene substituents. The substituent R can be any of the bivalent alicyclic, acyclic or arene hydrocarbyl substituents.

The integer $t$ is equal to the valence of the substituent $R_2$.

The integer $s$ is equal to the number of R substituents in the amine having the structural Formula 2.

The phosphinoborine borourea compound of this invention can be recovered from this reaction, for example, as a liquid, a solid, a solution dissolved in a suitable solvent, or as a solid precipitate. The recovered polymer can be isolated by any of the conventional isolation procedures, such as crystallization, filtration and the like.

The phosphinoborine borourea compounds of this invention have the formula:

$$\left[\left(L\right)_v\left(E\right)_w\left(L\right)_x\right]_a(K)_y$$

In this formula, the integers $a$, $v$ and $x$ are chosen so that $a(v+x)$ is at least 1 and can be 3000 or more; $v$ is an integer equal to at least 1; the sum of the integers $v+x$ equals the number of L substituents in said compounds; $w$ is an integer equal to the number of E substituents in said compounds and is at least 1; $x$ can be 0 or greater; and $y$ is an integer which is equal to the number of open valances on the boron atoms of the phosphinoborine polymers, L, after all of the borourea linkages have been formed. A borourea linkage has the formula $>B(H)NC(O)N<$.

The substituent K can be any of hydrogen, or the hydrocarbyl acyclic, alicyclic or arene substituents.

The ureido substituent E can be any of the following:

(3) 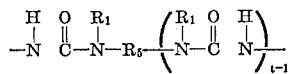

(4) 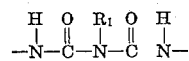

(5) 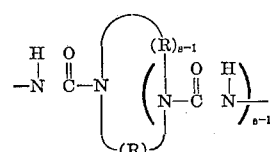

(6) 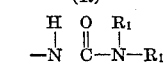

(7) 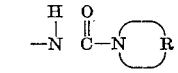

and mixtures thereof.

The substituent L can be any of the following:

($a_1$) $[R_4R_3PB=]_n$
($b_1$) $[R_4R_4PB=]_nA$
($c_1$) $[=BP(R_3)R(R_3)PB=]_n$
($d_1$) $[R_4R_3PB=]_m[R_3PB—]_z$

The substituent $R_5$ has a valence equal to $t-1$ and can be any of acyclic, alicyclic or arene hydrocarbyl substituents. In these substituents, R, $R_1$, $R_3$, A, $s$, $t$, $n$, $m$ and $z$ all have the values indicated previously.

The borourea compounds of this invention range from simple compounds to highly cross-linked infusible materials. These compounds can range in their physical properties from liquids, to glasses or crystalline solids in their normal state under ambient conditions. The polymer borourea compounds can be either thermoplastic or thermosetting in nature. These borourea compounds, both polymeric and non-polymeric, are used, for example, as components in flame-resistant compositions, plasticizers, fuel additives, neutron absorbers, molding composition extenders, laminating resins, high temperature insulation, heat transfer mediums, films, filaments, molded articles and the like.

The character of the borourea compounds is determined by selection of the starting materials. Thus, if mono-functional reactants are used to prepare these borourea compounds, the borourea compounds will be non-polymeric. If di-functional reactants are chosen as the starting materials, linear borourea polymers will be formed. The use of tri-functional reactants results in the preparation of cross-linked borourea polymers.

The preferred borourea compounds of this invention are polymers, so that in the above formula, our preferred derivatives are those in which a $(v+x)$ is at least 3 and can be up to 3000 or more.

The character of the polymeric boroureas of this invention can be controlled by adjusting the ratio of tri-functional, or higher poly-functional, reactants to di-functional reactants. In general, the greater the proportion of tri- or higher poly-functional reactants, the harder and more infusible the polymers. If the proportion of di-functional reactants is increased, the polymer becomes more thermoplastic and flexible.

The molecular weight of the borourea polymers can be controlled within limits by the addition of mono-functional reactants to a mixture of di- and tri-functional reactants. The greater the proportion of mono-functional material, the lower the average molecular weight. End blocking of the polymer can be accomplished in many ways, such as cyclization, reaction with impurities, or reaction with mono-functional reactants.

The nature of the reaction medium in which the phosphinoborine borourea compounds are prepared is not critical, however, since the reaction product is normally solid, the reaction becomes difficult to carry out if no solvent is employed. This is so because it becomes difficult to mix the reactants when a large amount of solid phase is present in the reaction mixture.

A large number of solvents can be used in the process of this invention, including: *aliphatic ethers* such as diamyl ether, diheptyl ether, isobutyl neopentyl ether, diisopropyl ether, dimethyl ether, diethyl ether, dipropyl ether, butyl ethyl ether, hexyl methyl ether; *arene ethers* such as anisole, phenetole, diphenyl ether, veratrole, benzyl phenyl ether, dinaphthyl ether; *cyclic ethers,* such as tetrahydrofuran, dioxane, tetrahydropyran; *arene or aliphatic hydrocarbons,* such as diisoamyl, hexane, n-hexadecane, cyclohexane, iso-octane, cyclopentane, tri-methylpentane, 2-methylpentane isopentane, methylcyclohexane, benzene, octadecylcyclohexane, naphthalene, toluene, p-xylene, naphtha, butylbenzene, ethylbenzene, cumene, octadecylbenzene, and the like. Mixtures of solvents can be used if desired.

Cooling and heating steps can be provided in the process as desired. The temperature at which the B-isocyanato phosphinoborine polymers are reacted with amines is not critical. The effect of varying reaction temperature is a corresponding increase or decrease in the rate of reaction. This process can be carried out at a temperature within a range of from about 25° C. to about 300° C., and preferably within a temperature range of about 35° C. to about 200° C. Below about 25° C., the reaction tends to be so slow as to be impractical to carry out within a reasonable length of time. Above about 300° C., extensive decomposition of the reactants and products occurs, so that yields of the desired product are substantially reduced.

The reaction can be conducted at atmospheric, sub-atmospheric or super-atmospheric pressure as desired without any substantial effect on the course of the reaction.

The process of this invention can be accomplished in batch, semi-continuous or continuous operation, as desired.

In order to illustrate the invention even more clearly, the following specific examples are set forth. It will be understood, of course, that these examples are for illustrative purposes only and are not intended to limit the invention in any way. In the following examples and throughout the specification and appended claims, all parts and percentages are by weight unless otherwise indicated.

Example I typifies the production of a non-polymeric borourea compound of this invention.

*Example I*

To 0.1591 g. (0.606 mmole) of

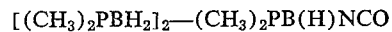

in a 5 ml. heavy-wall tube is added 1.0 ml. (0.69 g., 15 mmoles) of ethylamine in vacuo at −196° C. The sealed tube is heated at 100±2° C. for 15 hrs., opened on a vacuum line and 18.23 cc. (0.813 mmole) of hydrogen is removed. After removal of the excess amine the white residue is heated slowly in vacuo. No sublimate is formed up to 100° C.; and only a trace amount sublimes up to 125° C. The infrared spectrum of the residue shows absorption bands at 3350 (N—H stretching), 1620 (amide I band) and 1550 cm.⁻¹ (amide II band) indicating

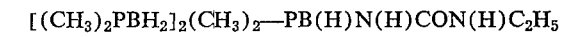

to be present in the mixture.

Analogous reactions can be accomplished using other aliphatic amines such as methylamine, dimethylamine, tertiary butylamine and the like, in place of the ethylamine used in this example.

A similar reaction is accomplished when the B-isocyanato phosphinoborine polymer of this example is replaced with any of the following polymers:

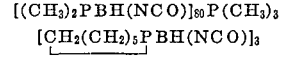

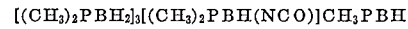

Example II typifies the production of non-polymeric borourea compounds using a secondary amine reactant according to this invention.

*Example II*

To 0.1056 g. (0.402 mmole)

in a 5 ml. heavy-wall tube is added 1.0 ml. of diethylamine in vacuo. On warming the sealed tube to ambient temperature, solution is affected. The tube is heated at 100±2° C. for 18 hrs., then opened on a vacuum line at −196° C. and a small quantity, 1.72 cc., of remaining white solid residue is removed mechanically. The 0.1277 g. of crude $[(CH_3)_2PBH_2]_2(CH_3)_2PB(H)N(H)CON(C_2H_5)_2$ M.P. 83–89° C., represents a crude yield of 94.6%. Crystallization from 10 ml. of 50% ethanol-water provides 0.0820 g. of fine, white needles, M.P. 97.5–99° C. (softening at 93° C.). Recrystallization from heptane provides an analytical sample, 0.0264 g., M.P. 101–102° C. *Anal.*—Calcd. for $C_{11}H_{34}B_3P_3N_2O$: C, 39.34; H, 10.21; M.W., 335.8. Found: C, 39.57; H, 10.22; M.W., 395 (vapor pressure osometer). Important infrared absorption bands (KBr disc) are present at 3460 (m, N—H), 1628 (vs, C=O), 1493 (vs, N—H bending), 1460 (m, shoulder, —C—CH$_2$—) 1428 (m, P—CH$_2$), 1413 (m, P—CH$_2$), 1373 (m, C—CH$_3$ symmetrical deformation), 1300 (m, P—CH$_3$) and 1285 (P—CH$_3$) cm.$^{-1}$.

Non-polymeric borourea compounds are also obtained when ethylene diamine, aniline, piperidine or ammonia is substituted for the diethylamine in this example.

A similar course of reaction is achieved by the substitution of any of the following:

[(C$_6$H$_5$)CH$_3$PBH(NCO)]$_3$
[(C$_8$H$_{17}$)CH$_3$PBH$_2$]$_2$(C$_8$H$_{17}$)CH$_3$PBH(NCO)
[(OCN)HBP(CH$_3$)(CH$_2$)$_{12}$(CH$_3$)PBH(NCO)]$_n$
[(OCN)HBP(CH$_3$)C$_6$H$_4$(CH$_3$)PBH(NCO)]$_n$ for the B-isocyanato phosphinoborine polymer of this example.

Example III is illustrative of the preparation of the polymeric borourea compounds of this invention.

*Example III*

The same procedure is followed as described under Example I, with the exception that the isocyanato which is reacted with a molar excess of ethylene diamine is [(CH$_3$)$_2$PBH(NCO)]$_2$(CH$_3$)$_2$PBH$_2$. The product of this reaction is the linear polymer having the general formula:

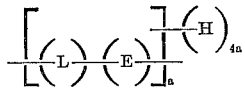

wherein the substituent L is the compound

[(CH$_3$)$_2$PB=]$_3$ and the substituent E is the radical

—N(H)CON(H)C$_2$H$_4$(H)NOC(H)N— and *a* is greater than 3.

The repeating unit of this polymer has the formula

[⎡HBP(CH$_3$)$_2$][(CH$_3$)$_2$PBH$_2$][(CH$_3$)$_2$PBH]N(H)CON(H)C$_2$H$_4$(H)NOC(H)N—]$_a$

A cross-linked polymeric borourea can be produced by replacing the reactants of this example with

[(CH$_3$)$_2$PBH(NCO)]$_3$ and hexamethylene diamine.

The resultant cross-linked borourea polymer has the general formula:

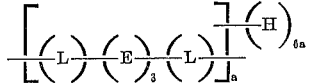

In this formula, each of the L substituents has the specific formula [(CH$_3$)$_2$PB=] and each of the E substituents has the specific formula

[—N(H)CON(H)(CH$_2$)$_6$(H)NOC(H)N—]

In the preparation of this polymer, a tri-functional phosphinoborine polymer substituent was utilized with a di-functional amine. Substantially similar results are produced using the di-functional phosphinoborine polymer substituent of this example with the tri-functional diethylene triamine.

A hard infusible highly cross-linked borourea polymer is produced when the reactants of this example are replaced with 1,3-diamino-2-2-dimethylpropane and

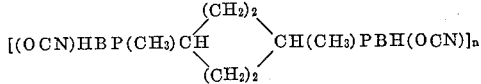

Example IV is illustrative of the preparation of the isocyanato substituted polymers which are representative of the starting materials used in the present invention.

*Example IV*

Employing a 50 ml. two-neck flask equipped with a thermometer, magnetic stirring bar and condenser, a heterogeneous mixture of 0.2146 g. (0.617 mmole) of [(CH$_3$)$_2$PBH$_2$]$_2$(CH$_3$)$_2$PBHI and 0.2000 g. (2.47 mmoles) of potassium cyanate in 10 ml. of dimethylformamide (dried by azeotropic distillation with benzene) is heated at 100±5° C. for 8 hours. The mixture is cooled to room temperature and diluted with 10 ml. of water which affects the precipitation of a white crystalline solid. After cooling to −20° C., the precipitate is collected, washed with 5 ml. of water and air dried. There is obtained 0.1380 g. (85% crude yield) of the B-isocyanato phosphinoborine polymer having the formula

[(CH$_3$)$_2$PBH$_2$]$_2$(CH$_3$)$_2$PB(NCO)H

M.P. 57–63° C. Two crystallizations from ethanol-water (5:3) significantly raises the melting point of the product to 69.5–71.5° C. (0.0931 g., 57%). An additional crystallization affords even purer material, 0.0803 g., M.P. 71–72° C. (assaying 99.0% by vapor phase chromatography). The infrared spectrum of this material displays bands characteristic of the phosphinoborine trimer nucleus and the isocyanato function (2280 cm.$^{-1}$).

Example V is illustrative of the preparation of B-halophosphinoborine polymers.

*Example V*

To a stirred solution of 0.3830 g. (1.733 mmoles) of dimethylphosphinoborine trimer, prepared according to the procedure described in Burg et al. U.S. Patent No. 2,877,272, issued March 10, 1959, is added dropwise a benzene solution of 0.3101 g. (1.742 mmoles) of N-bromosuccinimide. The reaction mixture is stirred at room temperature for 2 hours and then heated to reflux for 10 minutes. The reaction mixture is then evaporated to dryness and extracted with 20 ml. of hot i-hexane. The i-hexane extract, after several recrystallizations, yields needles of B-bromodimethylphosphinoborine trimer, M.P. 76–78° C.

As illustrated in the foregoing examples, the process of the present invention can be carried out utilizing a wide range of N-hydroamines. Typical of these amine reactants are, for example, the primary and secondary amines including: *annular amines* such as pyrazolidine, piperazine, piperidine, pyrrole, 2,4-dimethylpyrrole, indole, 3-pyrazoline, pyrrolidine, 3-pyrroline, triazolidine, 1,3-propylene imine, trimidine, and hydroacridine; *aromatic amines* such as anthramine, aniline, trimethylaniline, o, m and p- toluidine, and o, m, and p-phenylenediamine, benzidine, o-tolidine, β-naphthylamine, aminoanthraquinone, nitroaniline, and xylidines; *aliphatic amines* such as methylamine, ethylamine, propylamine, butylamine, hexylamine, laurylamine, ethylenediamine, tetramethylenediamine, hexamethylenediamine, diethylenetriamine, triethylenetetramine, pentaethylenehexamine, dimethylamine, diisobutylamine, and *ammonia*. Preferred N-hydroamines include aniline, benzidine, the lower alkyl amines and the lower alkylene diamines.

The alicyclic, acyclic and arene hydrocarbon substituents present in the compounds of the present invention can be monovalent or polyvalent as desired. Typical examples of the monovalent hydrocarbyl substituents used in reactants and products of this invention include: *aryl* substituents such as phenyl, biphenylyl, naphthyl, and indanyl; *alkaryl* substituents such as cumenyl, tolyl, xylyl, mesityl, benzyl, phenylethyl, phenethyl, diphenylmethyl, α-methylbenzyl, trityl, 2-methylbenzyl and 3-phenylpropyl; *alkyl* substituents such as methyl, ethyl, propyl, butyl, amyl, neopentyl, decyl, hexyl, 2-methylpentyl, 5-methylhexyl, dodecyl and iso-octyl; and *cycloalkyl* substituents such as cyclohexyl, cyclopentyl, cycloheptyl, 4-methylcyclohexyl, 2,4,6-trimethylcyclohexyl and 3-isopropylcyclopentyl. Preferred substituents include the lower hydrocarbyl substituents, phenyl; lower alkyl substituted phenyl; lower alkyl substituents having from 1 to 12 carbon atoms; and cycloalkyl substituents having 5 or 6 annular carbon atoms. These substituents have been found to produce the most desirable results. The most preferred substituents are the lower hydrocarbyl substituents having from 1 to 12 carbon atoms, such as, for example, lower alkyl substituents and the phenyl radical. The reactions proceed easily and the products are particularly useful and stable compounds when these substituents are present.

Typical examples of the bivalent hydrocarbylene substituents which can be used in the products and reactants of this invention include: *arylene* substituents such as phenylene, naphthylene, acenaphthenylene and biphenylene; *alkarylene* substituents such as durylene, benzylidene, xylylene and tolylene; *alkylene* substituents such as methylene, ethylene, hexamethylene, neopentylene, isobutylene, propylene and tetramethylene; and cycloalkylene substituents such as cyclohexylene and cyclopentylene. Preferred bivalent hydrocarbylene substituents include lower hydrocarbylene substituents such as phenylene; lower alkyl substituted phenylene; lower alkylene substituents having from 1 to 12 carbon atoms; and cycloalkylene substituents having 5 or 6 annular carbon atoms. The most preferred substituents are the lower hydrocarbylene substituents having from 1 to 12 carbon atoms including, for example, lower alkylene substituents. These substituents have been found to produce the most desirable results and the reactions proceed easily in their presence.

The following specific compounds exemplify the general structure of the polymers used in this invention:

A typical B-isocyanato phosphinoborine polymer which is characteristic of the structure of polymers having the general Formula *a* $[R_4R_3PB(Y)_2]_n$ is the trimeric B-isocyanato P-dimethylphosphinoborine where $n$ equals 3, having the structural formula:

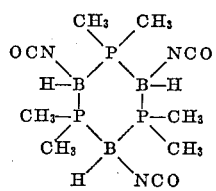

A typical B-isocyanato phosphinoborine polymer which is characteristic of the structure of polymers having the general Formula *b* $[R_4R_3PB(Y)_2]_nA$ is the linear polymer B-isocyanato-P-dimethylphosphinoborine having a degree of polymerization of 3, terminated with an acidic borine group on one end and a basic secondary phosphine on the other, and having the structural formula:

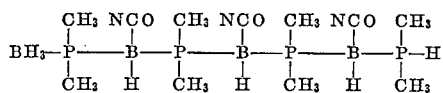

A typical B-isocyanato phosphinoborine polymer which is characteristic of the structure of polymers having the general of Formula *c* $[(Y)_2BP(R_3)R(R_3)PB(Y)_2]_n$ is the separate ring polymer having the formula:

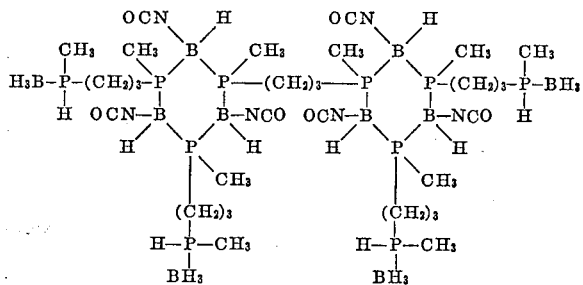

A typical B-isocyanato phosphinoborine polymer which is characteristic of the structure of polymers having the general Formula *d* $[R_4R_3PB(Y)_2]_m[R_3PBY]_z$ is the fused ring polymer having the formula:

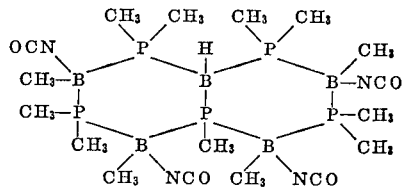

The polymer which has the general Formula *c* is terminated, as indicated above in the specific structural formula, with acidic groups. The number of acidic groups varies with the specific structure of the polymer and can range from 4 to about $n+2$. Acidic terminating groups on polymer (*c*) can be any of those defined above with reference to Formula *b*. These groups are acidic by the Lewis acid concept of acidity.

The terminating group, —A, in polymer (2) is basic in nature. Substantially any group, organic or inorganic, which is basic enough to attach to the acidic boron group, which is on the end of the polymer chain, will terminate the chain. Convenient terminating groups include the secondary and tertiary phosphines and amines which can be represented by the general formula $-D(R_1)_3$, where D is either phosphorous or nitrogen and $R_1$ is as defined above with the provision that no more than one $R_1$ in any one group is hydrogen. The nature of the inert basic end groups is not critical in this invention since it does not enter into the reaction in any way and is present only because a linear polymer must be terminated in order to prevent cyclization.

The ratio of $m$ to $z$ in polymer (*d*), above, determines the extent to which the rings in the polymer are fused together. The larger $z$ is with respect to $m$, the greater the number of ring fusions in the polymer. Thus, if the ratio of $m$ to $z$ is 1:1 or less, the rings are highly fused, while if the ratio is 6:1 or greater, generally the rings are larger and contain more annular phosphinoborine groups with few ring fusions. The ratio of $m$ to $z$ can be as low as about 0.1:1 and as high as about 6:1. Preferably, the ratio of $m$ to $z$ is between about 0.5:1 and 4:1 since these are the easiest to produce and have very desirable physical properties. Polymers which have a ratio close to 0.5:1 are highly cross-linked solids while those having a ratio close to 4:1 are generally viscous liquids.

The integer $n$, which is indicative of the degree of polymerization of polymers (*a*) through (*c*), can range from two for the simple linear polymers and three for the simple cyclic polymers through 3,000 and even higher.

As will be understood by those skilled in the art, what has been described is the preferred embodiment of the invention; however, many modifications, changes and substitutions can be made therein without departing from the scope and the spirit of the following claims.

What is claimed is:
1. A process for preparing a phosphinoborine borourea compound which comprises reacting a phosphinoborine polymer with an amine, said phosphinoborine polymer being selected from at least one of the group consisting of:

(*a*)            $[R_4R_3PB(Y)_2]_n$
(*b*)            $[R_4R_3PB(Y)_2]_nA$
(*c*)            $[(Y)_2BP(R_3)R(R_3)PB(Y)_2]_n$, and
(*d*)            $[R_4R_3PB(Y)_2]_m[R_3PBY]_z$ wherein
Y is selected from the group consisting of hydrogen, hydrocarbyl and isocyanato substituents; at least one of said Y substituents in each of said (*a*) (*b*) (*c*) and (*d*) being isocyanato;
$R_3$ and $R_4$ are hydrocarbyl substituents which are independently selected for each monomeric unit;
R is a hydrocarbylene substituent;
$n$ is an integer indicative of the degree of polymerization of said phosphinoborine compound;

$m$ and $z$ are integers, the ratio of which is indicative of the degree of ring fusion in said polymer ($d$);

A is a basic terminating group;

and said amine is selected from at least one of the group consisting of:

(1) $\quad$ (HNR$_1$)$_t$R$_2$ and (2) $\quad$ (HN)$_s$ (R)$_s$ wherein $R_1$ and $R_2$ are each independently selected from the group consisting of hydrogen, acyclic, alicyclic and arene substituents;

R is a bivalent hydrocarbyl substituent;

$t$ is an integer equal to the valence of the substituent $R_2$; and $s$ is an integer equal to the number of R substituents in the amine having the structural Formula 2; and recovering said borourea compound.

2. Process of claim 1 wherein said N-hydroamine is phenylenediamine.

3. Process of claim 1 wherein said N-hydroamine is ethyl amine.

4. Process of claim 1 wherein said N-hydroamine is ethylene diamine.

5. Process of claim 1 wherein said N-hydroamine is aniline.

6. Process of claim 1 wherein said N-hydroamine is hexamethylene diamine.

7. Process of claim 1 wherein said N-hydroamine is ammonia.

8. Process of claim 1 wherein said B-isocyanato phosphinoborine polymer has the formula

[(CH$_3$)$_2$PBH$_2$]$_2$(CH$_3$)$_2$PB(H)NCO

9. The product prepared by the process of claim 1.

10. The phosphinoborine borourea compound having the formula

[(CH$_3$)$_2$PBH$_2$]$_2$(CH$_3$)$_2$PB(H)N(H)CON(H)C$_2$H$_5$

11. Product produced by the process of claim 1 wherein said N-hydroamine is ethyl amine.

12. Product produced by the process of claim 1 wherein said N-hydromaine is ethylene diamine.

13. Product produced by the process of claim 1 wherein said N-hydroamine is aniline.

14. Product produced by the process of claim 1 wherein said N-hydroamine is hexamethylene diamine.

15. Product produced by the process of claim 1 wherein said N-hydroamine is ammonia.

16. Product produced by the process of claim 1 wherein said N-hydroamine is phenylenediamine.

No references cited.

SAMUEL H. BLECH, *Primary Examiner.*